Dec. 1, 1953 H. F. BUSHONG 2,661,052
ARMREST FOR AUTOMOBILE DOORS
Filed April 26, 1949 2 Sheets-Sheet 1
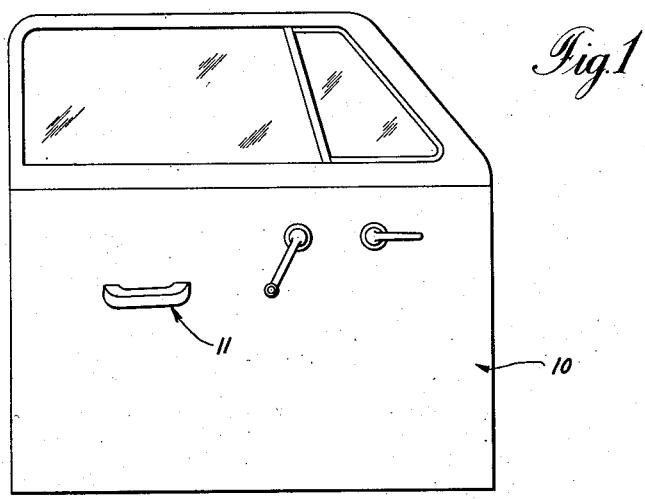
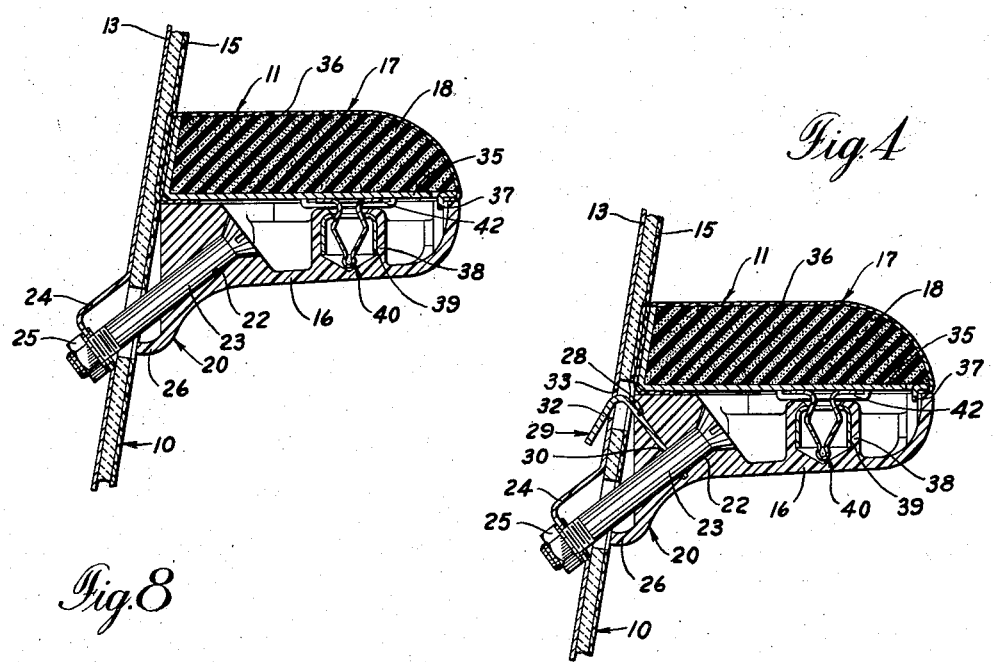
INVENTOR.
Harry F. Bushong
BY Brown, Jackson, Boettcher & Dienner
ATTORNEYS Dec. 1, 1953   H. F. BUSHONG   2,661,052
ARMREST FOR AUTOMOBILE DOORS
Filed April 26, 1949   2 Sheets-Sheet 2
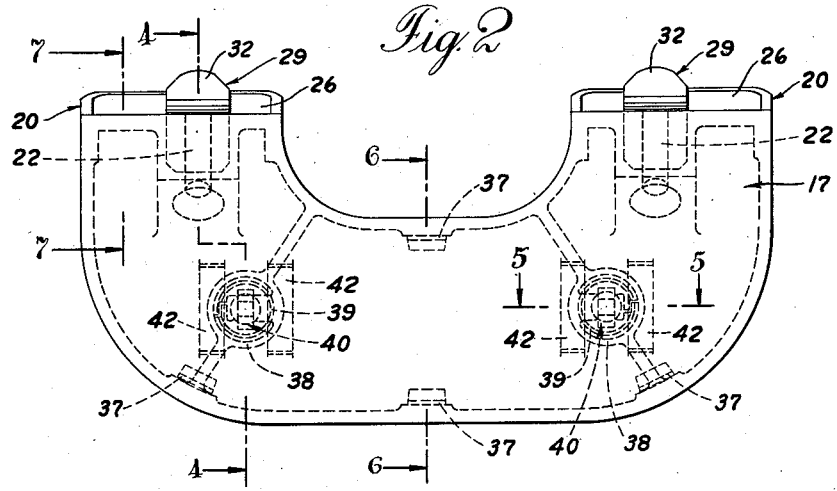
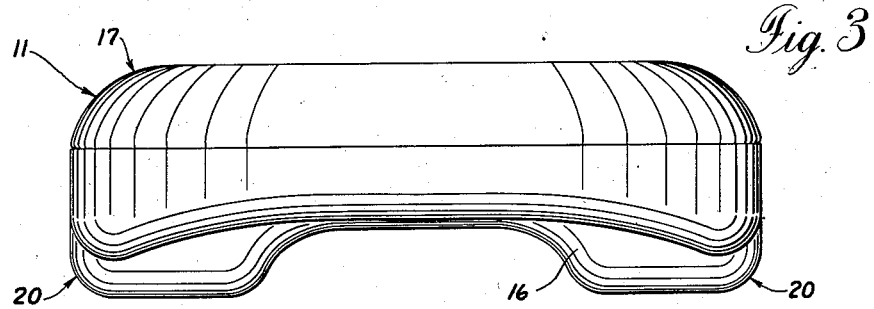
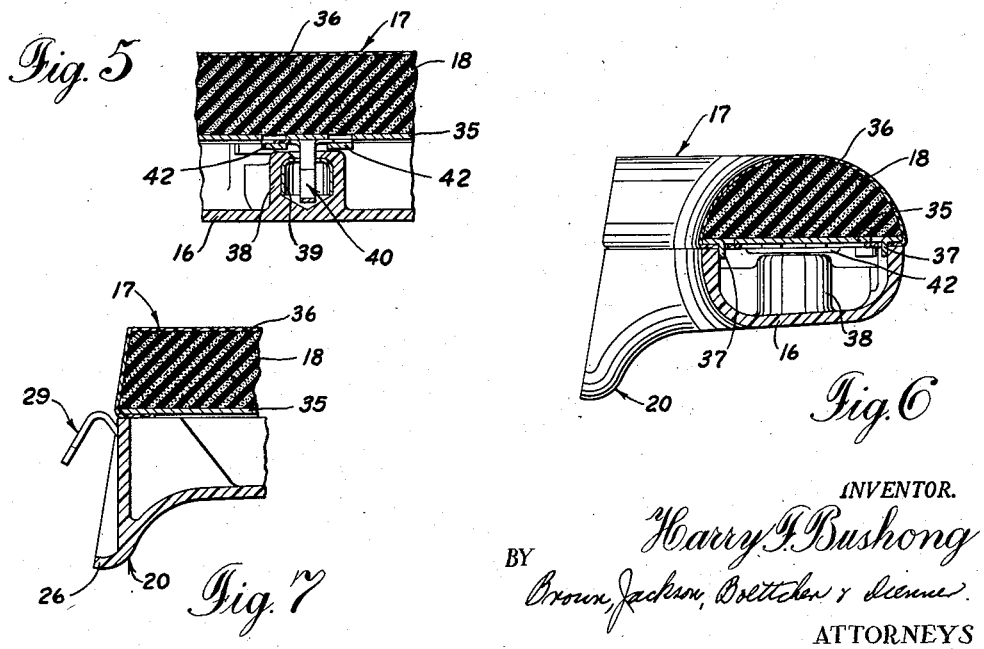
INVENTOR.
Harry F. Bushong
BY
Brown, Jackson, Boettcher & Dienner
ATTORNEYS Patented Dec. 1, 1953

2,661,052

UNITED STATES PATENT OFFICE 2,661,052

ARMREST FOR AUTOMOBILE DOORS

Harry F. Bushong, South Bend, Ind., assignor to The Studebaker Corporation, South Bend, Ind., a corporation of Delaware Application April 26, 1949, Serial No. 89,612

2 Claims. (Cl. 155—198)

My present invention relates to an arm rest for automobiles.

It is common practice in the automobile industry to provide arm rests on the doors of an automobile. The prior arm rests of this character with which I am familiar are mounted on the doors by means of bolts extending either horizontally or angularly upwardly through suitable bores or openings formed in the base or mounting members of the arm rests. The arm rests designed for the horizontal disposal of the mounting bolts are objectionable in that since the bolt heads are discernible, a finish must be applied to them, such as nickel plating, to give them an ornamental and attractive appearance. In the other referred to form of arm rest utilizing angularly upwardly extending bolts, the bolt heads are concealed from the normal line of vision by the base members of the arm rests, but it is necessary in such constructions for the assembler to either kneel, stoop or bend in order to insert and tighten the bolts which retain the arm rest to the door.

It is an object of my invention to provide an arm rest of the class described which avoids the aforementioned and other disadvantages and yet which is of simple and economic construction.

It is a further object of my invention to provide a two part arm rest in which one part constitutes a mounting base, and the other part a cover member for the base, in which bolt means provided for securing the base to the automobile door are concealed by the cover, and further in which detachable fastening means is provided between the base and cover member.

In order to achieve the aforesaid objects, I propose to provide an arm rest comprising essentially two parts or members in which one of said parts or members serves as a base member for the arm rest for securing it to the door, and the other part or member thereof serves as an upper or cover member mounted on the base by suitable detachable means, and in which the upper member preferably comprises suitable resilient means such as foam or sponge rubber covered by a suitable finishing fabric or upholstery to provide for the comfortable resting of an arm on the arm rest. Preferably in such an arrangement of parts the lower part or base member is of cup shape or recessed to provide an upwardly extending opening and is further provided with suitable bores extending angularly downwardly and outwardly from the opening through which bolts are adapted to extend for mounting the base member to the door. The base member may thus be mounted to the door by inserting the bolts through the open upper end of the base member to mount the base member to the door. Suitable detachable fastening means is provided between the cover member and the base member so that after mounting of the base member, the upper member may be readily and conveniently disposed in position to close the opening of the base member and complete the assembly of the arm rest to the door.

An important advantage of the construction of my present invention resides in the ability of the assembler to mount the arm rest to the door in either a standing or sitting position since the bolts are inserted angularly downwardly through the open upper surface of the base member. The construction noted considerably facilitates the work of the assembler in assembling the arm rest to the door with the further resultant attendant advantage of the saving of time for installation.

The construction noted has the additional advantage that the bolt heads are entirely concealed within the arm rest upon assembly of the cover member to the base member. Also the provision of detachable fastening means between the two parts or members of the arm rest enables the ready disassembly of the arm rest from the door should that be necessary.

The above and other objects and advantages of my invention will appear from the detailed description.

Now in order to disclose fully my invention, I shall describe in connection with the accompanying drawings a preferred embodiment of my invention.

In the drawings:

Figure 1 is a side elevational view of the interior of a door of an automobile vehicle showing the arm rest in my present invention applied thereto;

Figure 2 is an enlarged plan view of the arm rest shown in Figure 1;

Figure 3 is a front elevational view on an enlarged scale of the arm rest shown in Figure 1;

Figure 4 is a detail vertical sectional view taken substantially along the line 4—4 of Figure 2 looking in the direction indicated by the arrows, and showing in section a portion of a door to which the arm rest is applied;

Figure 5 is a detail vertical sectional view taken substantially along the line 5—5 of Figure 2 looking in the direction indicated by the arrows;

Figure 6 is a vertical sectional view taken substantially on line 6—6 of Figure 2 looking in the direction indicated by the arrows;

Figure 7 is a detail vertical sectional view taken substantially along the line 7—7 of Figure 2 looking in the direction indicated by the arrows; and Figure 8 is a vertical sectional view similar to Figure 4 but showing another embodiment of my invention.

Referring now to the drawings, I have shown in Figure 1 a conventional automobile door 10 on the interior of which an arm rest 11 of my invention is shown in mounted position. The door 10 as best shown in Figure 4 comprises a suitable inner sheet metal panel 13 which is covered by the conventional upholstery 15. The construction of the sheet metal panel 13 for the door is conventional in most respects and the modification thereof for effecting the mounting of the arm rest 11 of my invention thereon will be hereinafter noted.

The arm rest 11 as best shown in Figures 2, 3 and 4 comprises a base member 16 formed, for example, of a phenolic condensation product or other suitable plastic material or the like, and an upper part or cover member 17 comprising a mass of resilient material, such as foam or sponge rubber 18, on which the arm may be laid for supporting the same in resting position on the arm rest. The base member 16 and the cover member 17 may be of any desirable configuration and dimension, but in the preferred form of my invention these members as viewed in plan, as shown in Figure 2, are substantially of U-shape. The base member 16 includes a pair of leg portions 20, the outer ends of which are adapted to project toward the inside surface of the door 10 in the mounted position of the arm rest on the door. The U-shape formation of upper and lower parts of the arm rest provide a convenient handle or grip so that the arm rest also serves as a door pull for closing the door of the vehicle. This general configuration and outline of the arm rest is conventional in the art and it will be understood that the adaptation of my invention to an arm rest is not dependent upon the shape, size or configuration thereof.

Referring now more particularly to Figure 4 it will be observed that the base member 16 is substantially cup shape or recessed so that it is open along its upper surface. The leg portions 20 thereof as shown are formed with angularly downwardly extending bores 22 through each of which a bolt 23 is adapted to extend to secure the base member 16 to the inner panel of the door. In the preferred adaptation of my invention, the sheet metal panel 13 of the door is provided with a pair of brackets 24 formed by a suitable stamping operation in the fabrication of the door, and to each of which brackets 24 a nut 25 is preferably secured as by welding. The threaded ends of the bolts 23 are adapted to have threaded engagement with the nuts 25 so that by the provision of a pair of bolts 23 and a suitable pair of spaced brackets 24 at the adjacent ends of the leg portions 20, the base member 16 may be securely mounted at the inside of the door. As shown suitable apertures are formed in the upholstery so that the bolts 23 may project therethrough for threading engagement with the nuts 25.

In such instances in the adaptation of the arm rest of my invention to a car door of the character in which the inside of the door slopes generally upwardly and inwardly as illustrated in Figure 4 the extending arms 20 of the base members are provided with integral lips 26 for engaging the inside surface of the car door to position appropriately the arm rest so that the upper surface of the base member lies generally in horizontal plane.

In order to attach securely the base member 16 to the door, I propose further to provide each leg portion 20 of the base member with a clip 29 having an angularly downwardly extending arm which traverses the bore 22 therein. The clips 29 preferably are molded in the base member and the arms of the clips are formed with circular openings 30 substantially equal in diameter to that of the bores 22 so that the bolts 23 serves to retain the clips in the base member. Each of the clip members further comprises an angularly downwardly extending lip or arm 32 which is adapted to project through an opening 33 formed in the door panel 13 and an appropriate opening formed in the upholstery at that point. The lip 32 engages the adjacent portion of the door panel 13 at opening 33 and serves to prevent the force of a load imposed downwardly on the base member from moving the base member away from its proper mounted position on the door.

The upper or cover member 17 of the arm rest as previously related comprises a body of suitable resilient material 18 which is mounted on a sheet metal frame 35. Suitable fabric covering 36 encloses the body of resilient material 18 and the edges of the fabric covering are suitably secured to the frame 35. The frame member 35 as best shown in Figure 4 may have the outer edge thereof formed with a depending stamped flange 37 for engagement with the adjacent inner surface of the hollowed out or cup shaped base member 16 for positioning of the cover member on the base member.

As best shown in Figures 2 and 4 the base member 16 is formed with a pair of integrally molded hollow bosses 38 in which are embedded metal sleeve members 39 of detachable upholstery fastening means indicated generally at 40 to provide for detachably securing the cover and base members of the arm rest together. The sheet metal frame 35 of the cover member is formed with a pair of spaced stamped strap portions 42 in position thereon so as to be close to the bosses 38 of the base member in the mounted position of the cover member. Each pair of straps 42 provides for the mounting thereon of the free ends of an upholstery fastener 40. Each upholstery fastener 40 is adapted to have detachable yielding engagement with one of each of the sleeve members 39 retained within the bosses 38 with the construction described providing for the ready assembly and disassembly of the cover member of the arm rest with the base member.

In the construction described it will be observed that the base member may first be appropriately aligned with the car door at the position the arm rest is to be mounted and by manipulation of a screw driver the bolts 23 may be readily engaged with the nuts 25 to draw the base member 16 into engagement with the inside surface of the door and to mount it securely to the door. After the base member has been secured in position the cover member 17 of the arm rest may be snapped into position by means of the detachable fastening means 40 above described to complete the assembly operation. It will be observed that in the assembled position of the arm rest on the door that the mounting bolts 23 are entirely concealed but yet upon removal of the cover are readily accessible for servicing or repair of the arm rest should that be necessary. No appreciable load or strain is imposed upon the detachable fastening means 40 in that the imposition of the load on the arm rest is borne by the mounting means for the base member.

In the form of my invention shown in Figure 8 the arm rest is identical in all respects to the above described construction except that the reinforcing clips 32 have been omitted. In all other respect the structure is the same as that described and the like reference numerals indicate the same parts.

While I have shown and described what I consider to be preferred embodiments of my invention it will be understood that various modifications and rearrangements may be made therein without depart of spirit and scope of my invention.

I claim:

1. An arm rest for a door of an automobile or a like vehicle, comprising a rigid base member of substantially U-shaped plan configuration in which the leg portions thereof are adapted for mounting engagement with said door and are characterized by a recess extending inwardly of one surface thereof, each leg portion of said member being provided with an opening extending angularly from said recess therein, bolt means insertable in each opening of said leg portions for securing said base member to one side of a door panel so that the ends of said leg portions are adapted to lie in abutting engagement with said panel, said bolt means threadingly engaging holding nut means adapted to be mounted on the opposite side of said door panel, additional means for holding said base member to said door panel comprising clip means carried by said base member and adapted to have engagement with said panel, a cover member mounted over said base to encase and cover over said recesses and fastening bolt means, and snap-in fastener means depending from the underside of said cover and adapted to have resilient snap-in engagement with said base for detachably securing said cover thereto.

2. An arm rest and door pull for a door of an automobile comprising, a rigid base member of substantially U-shaped plan configuration, the bifurcated leg portions of said U-shaped base each having a recess formed inwardly of the upper surface thereof, each of said leg portions having an opening formed angularly from said recesses therein for the reception of suitable bolt holding means arranged to have threading engagement with said door for holding said base in juxtaposition of said door with the outer ends of said leg portions adapted to abut said door, additional holding means adapted to support said base on said door comprising clip members having arm portions disposed within said leg portions, said arm portions having openings therein aligned with said openings of said leg portions for the passage therethrough of said bolt means, lip portions on said clip members adapted to be connectively engaged with said door, a cover member substantially U-shaped in plan adapted to overlie said base and cover over said recesses and bolt means, and a plurality of resiliently compressible snap-in fasteners depending from said cover for detachably securing said cover to said base, said fasteners having resilient holding engagement with said base and being concealed by said cover when the latter is mounted to said base.

HARRY F. BUSHONG.

References Cited in the file of this patent

UNITED STATES PATENTS

| Number | Name | Date |
|---|---|---|
| 1,712,472 | Campbell | May 7, 1929 |
| 1,937,301 | Trautvetter | Nov. 28, 1933 |
| 1,955,181 | Goddard | Apr. 17, 1934 |
| 2,199,689 | Boogaard et al. | May 7, 1940 |
| 2,203,413 | Hood | June 4, 1940 |
| 2,314,522 | Sette | Mar. 23, 1943 |
| 2,325,292 | Westrope | July 27, 1943 |
| 2,563,222 | Doty | Aug. 7, 1951 |
| 2,601,677 | Wettlaufer | June 24, 1952 |